United States Patent [19]

Ikeda et al.

[11] 4,133,856

[45] Jan. 9, 1979

[54] PROCESS FOR PRODUCING A POSITIVE ELECTRODE FOR A NON-AQUEOUS CELL

[75] Inventors: Hironosuke Ikeda, Hirakata; Mitsunori Hara; Satoshi Narukawa, both of Kobe, all of Japan

[73] Assignee: Sanyo Electric Co., Ltd., Moriguchi, Japan

[21] Appl. No.: 829,494

[22] Filed: Aug. 31, 1977

[30] Foreign Application Priority Data

Sep. 29, 1976 [JP] Japan .................................. 51/118327

[51] Int. Cl.$^2$ ............................................. C04B 35/52
[52] U.S. Cl. ...................................... 264/63; 106/56; 264/104; 264/105; 423/599; 423/605; 429/224
[58] Field of Search .................. 264/104, 61, 63, 105; 429/224; 423/599, 605; 106/56

[56] References Cited

FOREIGN PATENT DOCUMENTS 4314612 10/1965 Japan ...................................... 429/224

OTHER PUBLICATIONS

Ikeda et al., *Manganese Dioxide as Cathodes for Lithium Batteries*, Manganese Dioxide Symposium, vol. 1, Cleveland 1975.

*Primary Examiner*—Robert F. White
*Assistant Examiner*—John A. Parrish
*Attorney, Agent, or Firm*—Armstrong, Nikaido, Marmelstein & Kubovcik

[57] ABSTRACT

A process for preparing positive electrodes for non-aqueous cells is provided. Manganese dioxide is heat treated at a temperature of from 350 – 430° C; the treated manganese dioxide is mixed with a conductive agent and binder and the mixture molded; and the molding is heat treated at a temperature of from 200 – 350° C. The process provides positive electrodes for non-aqueous cells having excellent discharge characteristics.

6 Claims, 4 Drawing Figures

PROCESS FOR PRODUCING A POSITIVE ELECTRODE FOR A NON-AQUEOUS CELL

BACKGROUND OF THE INVENTION

1. Field of the Invention

The present invention relates to a process for preparing positive electrodes for non-aqueous cells and, more particularly, to a process for preparing positive electrodes using manganese dioxide as the active material.

2. Description of the Prior Art

Non-aqueous cells, or batteries, in which a metal such as lithium is employed as the negative electrode (anode), manganese dioxide is employed as the active material for the positive electrode (cathode), and an organic substance is employed as the electrolyte are known.

In the case of using manganese dioxide as the active material of the positive electrode for non-aqueous cells, it is necessary to remove water contained in the manganese dioxide since the water has been found to be detrimental with respect to the active material of the negative electrode, i.e., lithium, etc., and with respect to the performance characteristics of the cells. Ikeda et al, *Manganese Dioxide as Cathodes for Lithium Batteries*, Manganese Dioxide Symposium, Volume 1, Cleveland, 1975, discloses that manganese dioxide heat treated at temperatures greater than 250° C. and formed into an electrode by pressing and heat-bonding a blend of the heat-treated electrolytic manganese dioxide with acetylene black and fluoric resin is suitable as the positive electrode in non-aqueous cells.

Although manganese dioxide heat treated as described in the Ikeda et al paper provides non-aqueous electrodes having good discharge characteristics it is still desired to improve the cell characteristics after storage and to improve the utilization of positive electrodes of non-aqueous cells.

SUMMARY OF THE INVENTION

According to the present invention it has now been found that the properties after stroage and the discharge characteristics of non-aqueous cells having positive electrodes of manganese dioxide are significantly improved by preparing the positive electrodes by heat treating manganese dioxide at a temperature range of 350–430° C.; combining the treated manganese dioxide with a conductive agent and binder; molding the resultant mixture; and heat-treating the resultant molding at a temperature within the range of 200–350° C.

BRIEF DESCRIPTION OF THE DRAWINGS

FIG. 1 being the initial discharge characteristics and FIG. 2 being the discharge characteristics after preserving the cells for one year at 45° C. and 90% humidity.

DESCRIPTION OF PREFERRED EMBODIMENTS

According to the process of the present invention, electrolytic manganese dioxide ($MnO_2$) known for use as the active material in positive electrodes for non-aqueous cells is heat treated in a first step at a temperature range of 350–430° C. The manganese dioxide may be any commercially available electrolytic manganese dioxide.

In general, manganese dioxide contains a large amount of combined water in addition to adherent water (see, for example, A. Tvarusko, *Investigation of Manganese Dioxide Water Content*, J. Electrochem. Soc., No. 2, Vol III (1964), p125; and JIS M 8231-1969, *Methods for Determination of Combined Water in Manganese Ores*). Thus, it has been confirmed by heat treating manganese dioxide at temperatures of 150–450° C. to remove the water therefrom and investigating the structure of the treated manganese dioxide by X-ray diffraction that manganese dioxide shows the $\gamma$-$MnO_2$ structure up to 200° C. In this case adherent water is removed from the manganese dioxide but combined water is retained in the manganese dioxide. The combined water begins to be gradually removed from the manganese dioxide at 250° C. at which temperature the structure of the manganese dioxide changes gradually from $\gamma$-$MnO_2$ to $\beta$-$MnO_2$. The structure of the manganese dioxide becomes the intermediate phase between $\gamma$-$MnO_2$ and $\beta$-$MnO_2$ at 250–350° C., and becomes $\beta$-$MnO_2$ in the temperature range of 350–450° C. $\beta$-$MnO_2$ begins to decompose at temperatures over 450° C.

Figure 1:
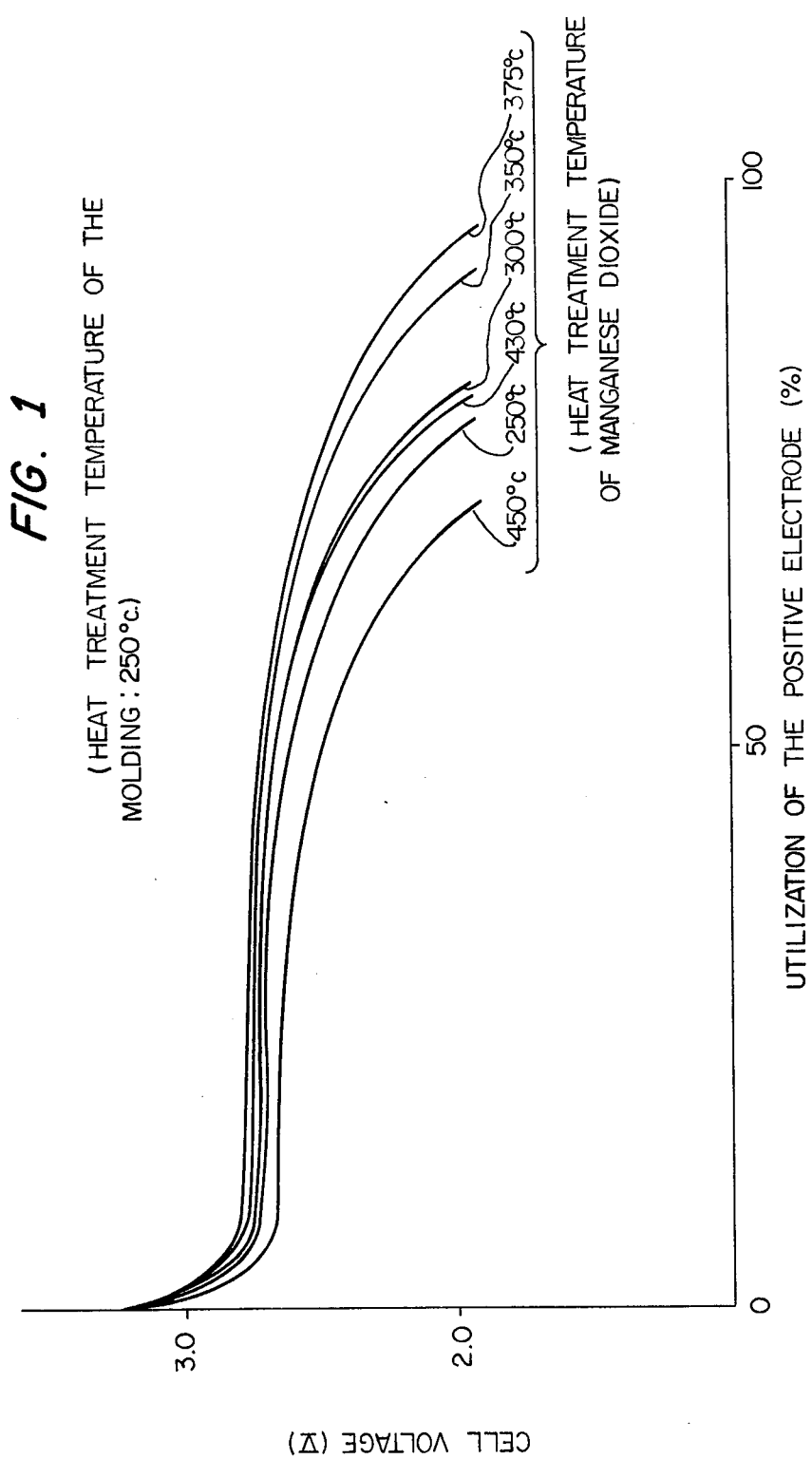
FIG. 1 and FIG. 2 are graphs showing the relationship between the heat treatment temperature of manganese dioxide as the active material of positive electrodes for non-aqueous cells and the cell characteristics (the heat treatment temperature of the molding is 250° C. under vacuum)
Figure 2:
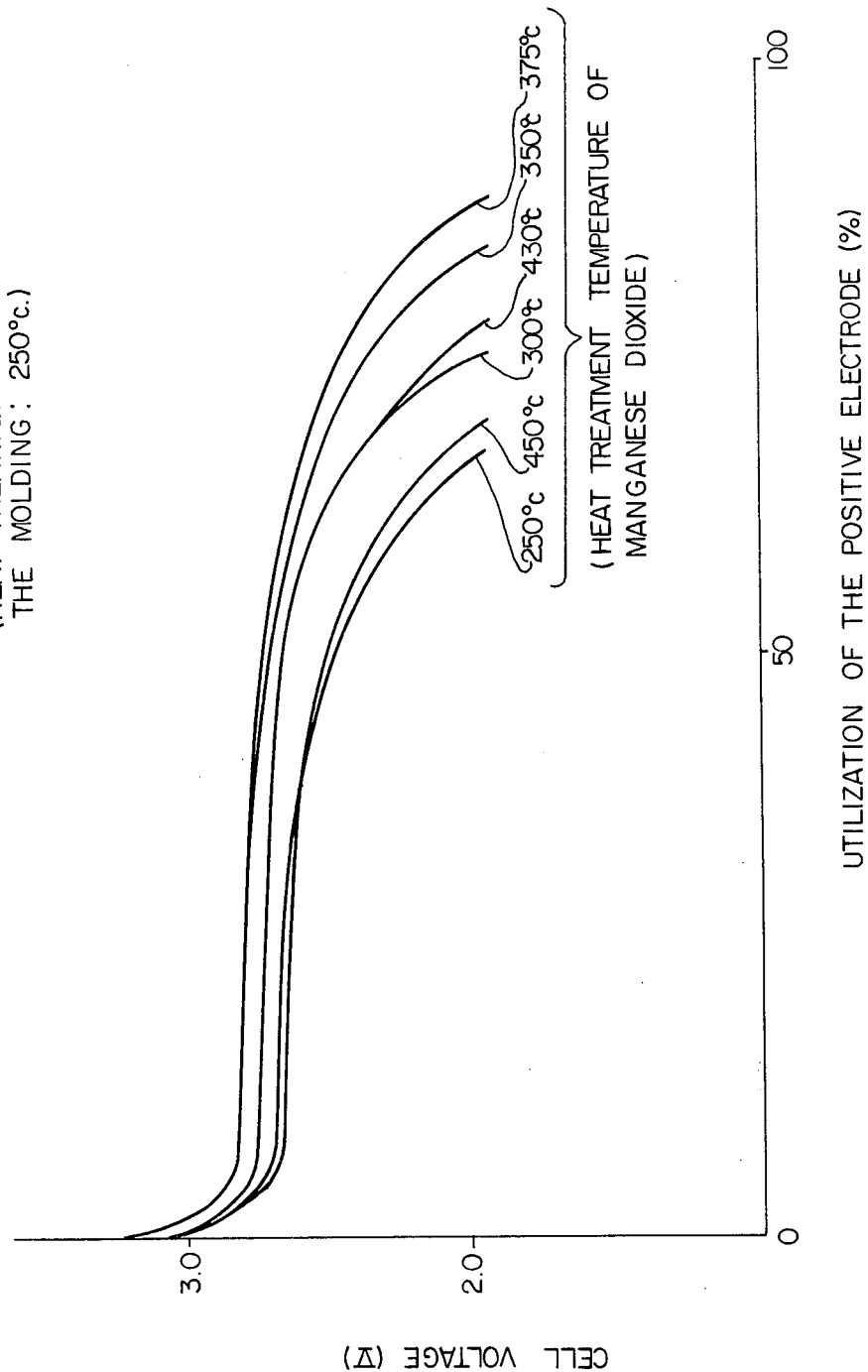

In light of these results, non-aqueous cells were prepared employing manganese dioxide heat treated at temperatures in the range of 250 to 450° C. (at which temperatures water contained in the manganese dioxide could be removed therefrom) for the positive electrode, lithium for the negative electrode and, as the electrolyte, a solution prepared by dissolving lithium perchlorate of 1 mole concentration in a mixed solvent of propylene carbonate and 1,2-dimethoxyethane. The cell characteristics for various temperatures for the heat-treatment were investigated. The results obtained are illustrated in FIG. 1 and FIG. 2 of the drawings. It is to be noted that the heat treatment temperature for the moldings of the manganese dioxide was 250° C. in a vacuum and that the discharge characteristics were measured at a current density of about 0.3 ma/cm$^2$.

Referring to FIG. 1 it can be seen that positive electrodes prepared using manganese dioxide heat treated at a temperature range of 300–430° C. can maintain a utilization of about 80% until the cell voltage reduces to 2.0 volts. Hence the utilization is higher than for positive electrodes prepared from manganese dioxide heat treated at temperatures other than the aforesaid temperature range. It can also be seen by referring to FIG. 1 that the use of manganese dioxide heat treated at the lower limit of the aforesaid temperature range does not differ greatly from the use of manganese dioxide heat treated at temperatures lower than 300° C., but the use of manganese dioxide heat treated at temperatures higher than the upper limit of 430° C. reduces greatly the utilization of the positive electrodes.

The reason is believed to be that manganese dioxide is caused to thermally decompose at temperatures higher than 430° C. and is partially converted into inactive $Mn_2O_3$. Thus, a temperature of about 430° C. is the upper limit of the heat-treatment temperature for the manganese dioxide.

FIG. 2 is a graph showing the discharge characteristics of non-aqueous cells stored for one year at a temperature of 45° C. and a humidity of 90%. It is clear from the characteristic graph that the utilization for manganese dioxide heat-treated at 300° C. is reduced considerably as compared to the initial characteristics shown in FIG. 1. This is believed to be caused by imperfect, or incomplete, removal of water from the manganese dioxide for heat treatment at about 300° C.

The manganese dioxide is heat-treated in a conventional manner at a temperature within the range of 350–430° C. to remove combined and adherent water for a period of from 2 to 4 hours in the minimum, or much more hours as the case may be.

Following heat-treatment a minor amount of water, within the range of one to two percent, will remain in the manganese dioxide depending on the temperature of treatment. This amount of water is considered to be bound in the crystal structure. Heat-treatment of the manganese dioxide may be carried out in a vacuum or under an inert atmosphere.

The heat-treated manganese dioxide is combined, or blended, with a conductive agent and a binder and is molded into the desired shape of the positive electrode. The conductive agents suitable for use in the process according to the present invention include any of those conductive agents presently employed in the art for producing positive electrodes for non-aqueous cells and include acetylene black and carbon black.

The binders for use in the process according to the present invention are also materials known in the art for preparing positive electrodes of manganese dioxide for non-aqueous cells and which are capable of providing sufficient binding properties, i.e., stability, at the temperature range for the heat treatment of the molding as discussed in further detail below. Suitable binders are fluoric resins including polytetrafluoroethylene, copolymers of tetrafluoroethylene and hexafluoropropylene, copolymers of tetrafluoroethylene and ethylene and polychlorotrifluoroethylene.

Blending of the treated manganese dioxide, conductive agent and binder and molding of the blend are carried out under conditions, other than temperature, known in the art. Thus, for example, the treated manganese dioxide may be mixed with the carbonaceous conductive agent and the fluoric resin binder in a weight ratio of 90:6:4 and molded under a pressure of 4 tons/cm$^2$.

Following molding of the mixture of the treated manganese dioxide, conductive agent and binder under pressure, the resultant molding is heat treated at a temperature of 200–350° C. at least for one hour in a vacuum or in an inert atmosphere. It has been discovered according to the present invention that the cell characteristics are also influenced by the heat treatment temperature of the moldings.

Figure 3:
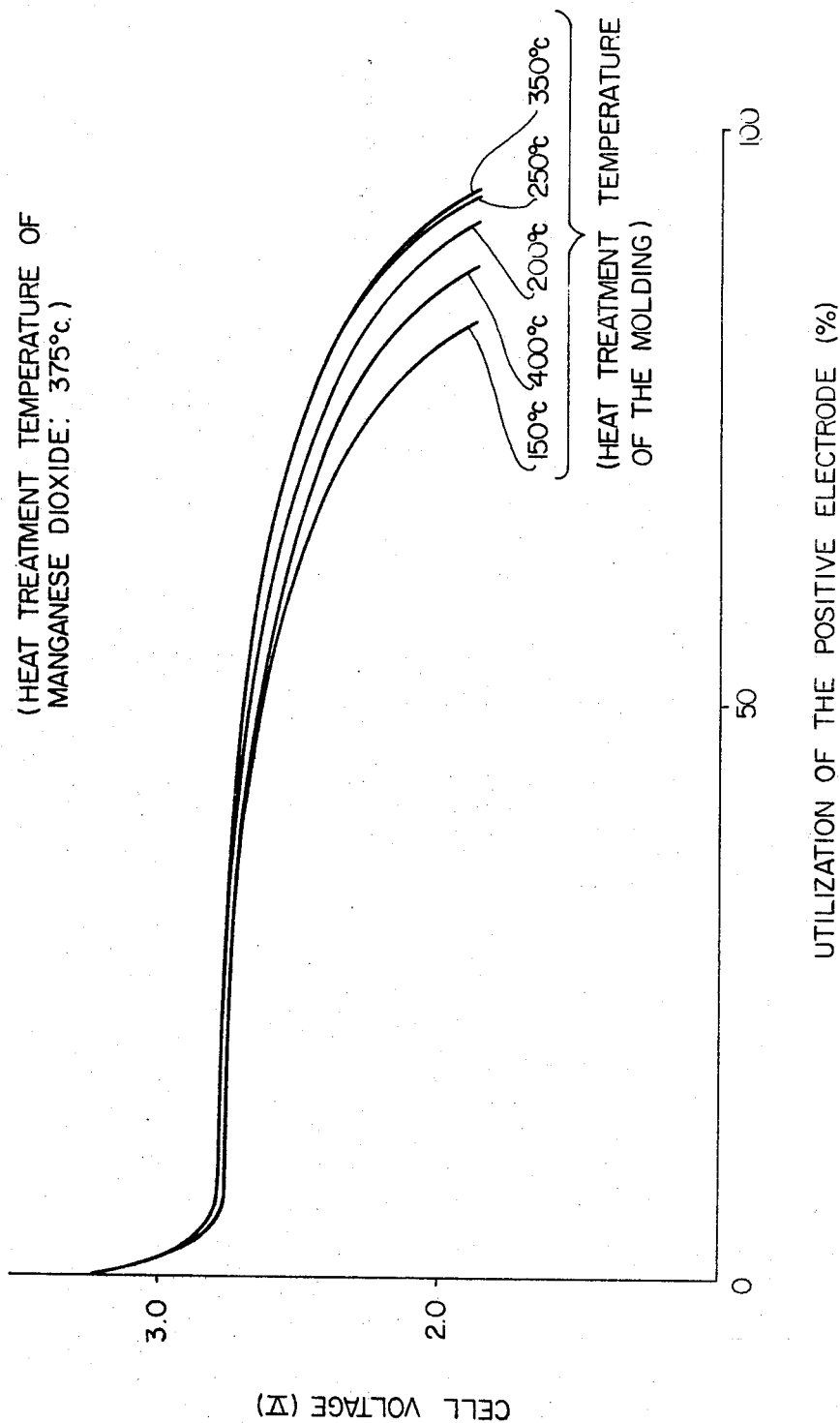
FIG. 3 is a graph of the initial discharge characteristics of a non-aqueous cell showing the relationship between the heat treatment temperature of the molding and the cell characteristics (the heat treatment temperature of the manganese dioxide is 375° C.).
Figure 4:
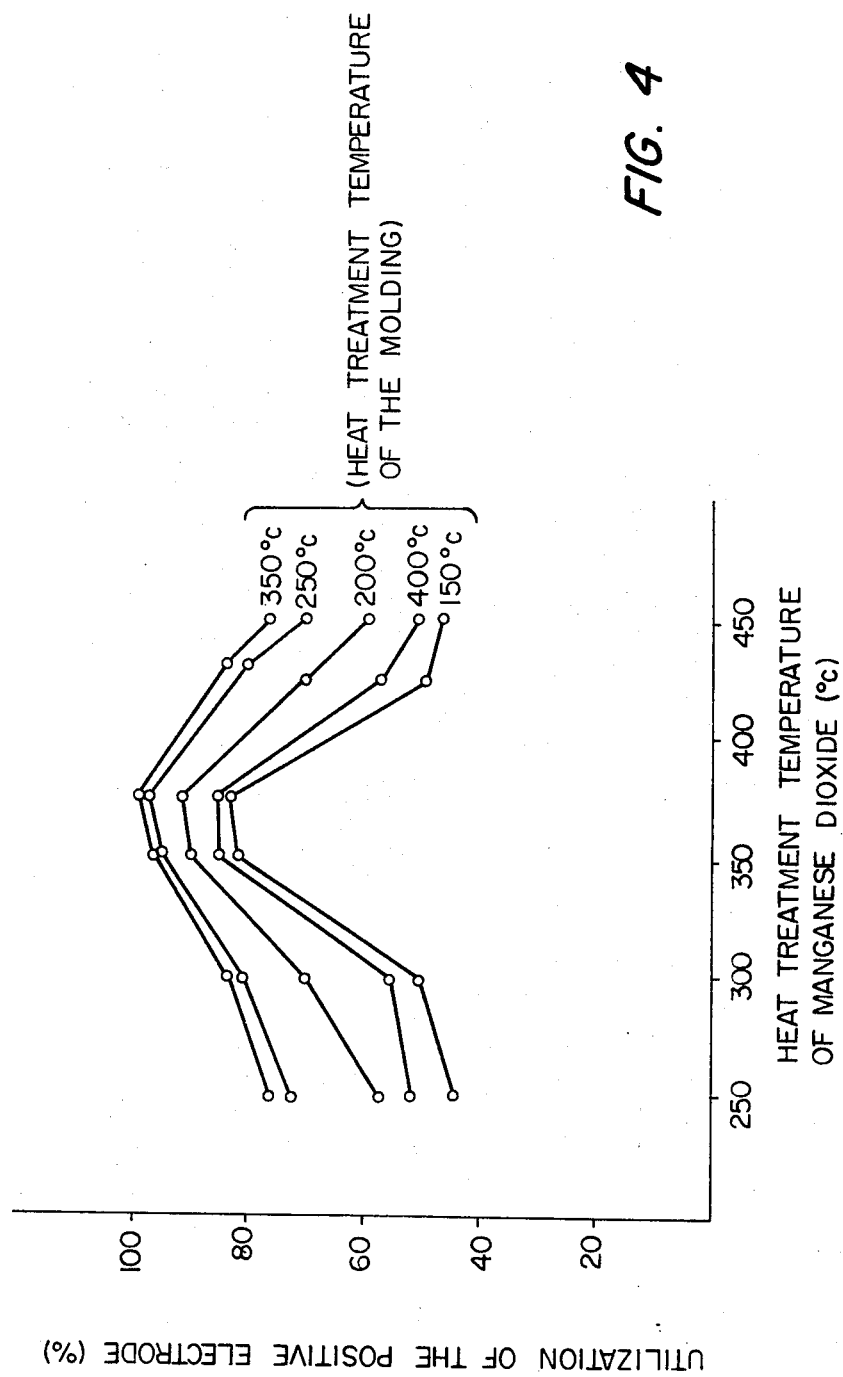
FIG. 4 is a graph showing the utilization of positive electrodes as a combined function of the heat treatment temperature of manganese dioxide and the heat treatment temperature of the moldings.

The materiality of the heat treatment temperature of the moldings may be seen by referring to the following examples which are to be read in light of the graphs shown in FIGS. 3 and 4.

Commercially available electrolytic manganese dioxide as an active material is heat-treated at a temperature of 375° C. for a period of more than two hours. The manganese dioxide thus treated is then mixed with sufficiently dried acetylene black (as the conductive agent) and polytetrafluoroethylene (as the binder) at a weight ratio of 90:6:4 and the mixture is molded under a pressure of 4 tons/cm$^2$. Thereafter, the molding thus formed is subjected to a final heat treatment at a temperature range of 200–350° C. to provide a positive electrode having a diameter of 10.5 mm and a thickness of about 2 mm.

A negative electrode is prepared by rolling a lithium plate to a desired thickness by means of roller in an argon-displaced dry box and punching the rolled plate to 8 mm.

A solution prepared by dissolving lithium perchlorate of 1 mole concentration in a mixed organic solvent of propylene carbonate and 1,2-dimethoxyethane of 1:1 ratio is used as the electrolyte and further a non-woven fabric of polypropylene is used as a separator. The cell has an outer diameter of 11.6 mm and a height of 5.6 mm.

FIG. 3 is a graph showing the initial discharge characteristics relative to the heat treatment temperature for the moldings and the cell characteristics. From the initial characteristic graph of the cells shown in FIG. 3, it will be understood that a discharge capacity of about 90–93% can be maintained for heat treatment of the moldings at a temperature range of 200–350° C.

For temperatures outside the above-described range, for example, at about 150° C., the discharge capacity is about 80%. The reason is believed to be that when manganese dioxide is heat-treated at 350–430° C. in the initial step, adherent water and combined water contained in the manganese dioxide are removed but when the manganese dioxide is mixed with the conductive agent and binder in the air, water adheres to the manganese dioxide again. However, when the molding prepared from the mixture is heat-treated at temperatures above 200° C. the adherent water is completely removed to increase the discharge capacity, i.e., to improve the discharge characteristics.

On the other hand, when the molding is heat-treated at temperatures above 350° C., for example, at 400° C., an unexpected reduction of discharge capacity is observed. The reason is considered to be that polytetrafluoroethylene used as a binder is decomposed at temperatures above 350° C., whereby $\gamma$-$MnO_2$ is converted to inactive $Mn_2O_3$.

The molding is heat treated, therefore, at a temperature of from 200–350° C. to remove adhered water and such that the binding properties of the binder are retained. FIG. 4 is a graph showing the combined effect of the heat treatment temperature of manganese dioxide and the heat treatment temperature of the moldings on the utilization of the positive electrode.

It is to be noted that non-aqueous cells may be produced from the positive electrodes prepared according to the present invention in a manner which is itself known in the art utilizing lithium as the negative electrode and an organic electrolyte prepared, for example, by dissolving lithium perchlorate dissolved in a mixed solution of propylene carbonate and dimethoxyethane and a non-woven fabric such as polypropylene as a separator.

It is seen, therefore, that the preparation of positive electrodes for non-aqueous cells according to the present invention provides cells having excellent utilization of the positive electrode.

In addition, although it has been believed that manganese dioxide heat treated at temperatures above 350° C. is modified from $\gamma$-$MnO_2$ to inactive $\beta$-$MnO_2$, according to the present invention it has been confirmed that manganese dioxide heat treated at temperature above 350° C. can be sufficiently used as the active material of positive electrodes for non-aqueous cells and further that the high temperature heat treatment is rather profitable because as a result the shelf life of the cells is improved.

Although the invention has been described in conjunction with certain preferred embodiments thereof, it is not to be limited thereto but, instead, is intended to include all those embodiments within the scope and spirit of the appended claims.

What is claimed is:

1. A process for producing a positive electrode for a non-aqueous cell comprising heat-treating manganese dioxide at a temperature within the range of 350–430° C.; combining the treated manganese dioxide with a conductive agent and a binder; molding the resultant mixture; and heat-treating the resultant molding at a temperature within the range of 200–350° C. to form said electrode.

2. The process of claim 1 wherein the heat-treatment of the manganese dioxide is carried out at least for two hours.

3. The process of claim 2 wherein the conductive agent is acetylene black.

4. The process of claim 3 wherein the binder is polytetrafluoroethylene.

5. The process of claim 4 wherein heat treatment of the molding is carried out at least one hour.

6. The process of claim 5 wherein the heat treatment temperature of the manganese dioxide is about 375° C.

* * * * *